United States Patent [19]

Crist

[11] Patent Number: 5,177,834
[45] Date of Patent: Jan. 12, 1993

[54] IRRIGATION PIPE HANDLE

[76] Inventor: Weston W. Crist, 7923 Mitcham, Amarillo, Tex. 79121

[21] Appl. No.: 799,364

[22] Filed: Nov. 27, 1991

[51] Int. Cl.⁵ ............................................. A47B 95/02
[52] U.S. Cl. ........................................ 16/125; 294/15
[58] Field of Search ................. 16/125; 294/15, 27.1

[56] References Cited

FOREIGN PATENT DOCUMENTS 111752  9/1925  Switzerland ...................... 16/125

*Primary Examiner*—W. Donald Bray
*Attorney, Agent, or Firm*—Wendell Coffee

[57] ABSTRACT

A handle is provided for a joint of PVC agricultural irrigation pipe. The handle is either integral with PVC end portions which are glued to the saddle or the handle is telescoped in PVC tubes which are glued to the saddle. The saddle is glued to the joint of pipe forming convenient means for carrying the pipe.

8 Claims, 2 Drawing Sheets

IRRIGATION PIPE HANDLE

BACKGROUND OF THE INVENTION (1) Field of the Invention

This invention relates to agricultural irrigation and more particularly to handles for Poly Vinyl Chloride (PVC) pipe. Farm laborers are those having ordinary skill in the art.

(2) Description of the Related Art

In row crop irrigation, normally water is supplied by a pipe running along one end of the rows. A gate or valve is provided for each crop row. Normally, when the water is supplied to the pipes, certain of the gates are opened to water certain rows. As soon as the crop rows in one area are watered, the pipe is moved to another area to water another area. Normally, the pipe joints are about 20' in length, although, they may be different lengths.

At one time, aluminum pipe was the major material used for row crop irrigation for agriculture. The aluminum pipes often had handles attached to them about half way between the ends so they could be easily picked up and moved.

At the present time, PVC pipe is the preferred and more common pipe used. PVC pipe is preferred because of its durability and light weight. A major impediment to the use of PVC pipe is the difficulty in providing a handle. Without a handle the joints of pipe are bulky and unwieldy to move. Since they are used in irrigation, the pipes will be wet, muddy, and slick to handle. One way of moving the pipe is to insert one or two fingers into one of the gates in the pipe and pick it up in that fashion. However, it is necessary to use the other hand or arm to steady or stabilize the pipe, inasmuch as it is difficult to control with one or two fingers in different holes. For that reason, some farmers have not completely converted from using aluminum pipe inasmuch as with the handles on aluminum pipe, the farmer could carry as many as four joints of pipe holding two handles in each hand, as compared to carrying only one joint of PVC pipe.

Some efforts have been made to place handles on PVC pipe. In at least one situation, efforts have been made to attach an aluminum handle by screws or bolts to a PVC saddle and the PVC saddle then glued to the pipe. However, this has proved unsatisfactory because of the difficulty associated with attaching an aluminum handle to the saddle. Self-tapping screws do not function well within the PVC. If a hole is drilled through the saddle, then it is necessary that the hole be countersunk so that the saddle can be fit flush against the pipe for purposes of gluing. Countersinking the holes will weaken the PVC saddle.

SUMMARY OF THE INVENTION (1) Progressive Contribution to the Art

I have invented a solution to the problem by forming a PVC saddle and attaching a handle to the saddle. The handle is also made of PVC material so that commercially available glues may be used to attach the handle to the saddle. Then the saddle may be attached to the pipe. The saddle is preferably made from a portion or a sector of pipe of about the same diameter as the pipe to which the saddle is to be applied. Preferably the saddle will cover a circumferential area of about ¼ to 1/12 of the joint of pipe. The handles can be attached to the saddle and attached to the pipe at the point of sale of pipe to the farmer. Alternatively, saddles with handles can be sold to a farmer who already has the pipe, to be attached by him in the field. The saddles are also glued to the pipes by the standard glues particularly made for PVC material.

(2) Objects of this Invention

An object of this invention is to move agricultural irrigation pipe for row crops.

Another object is to attach handles to PVC agricultural irrigation pipe.

Further objects are to achieve the above with devices that are sturdy, compact, durable, lightweight, simple, safe, efficient, versatile, ecologically compatible, energy conserving, and reliable, yet inexpensive and easy to manufacture, install, handle, and maintain.

Other objects are to achieve the above with a method that is rapid, versatile, ecologically compatible, energy conserving, efficient, and inexpensive, and does not require skilled people to install, and maintain.

The specific nature of the invention, as well as other objects, uses, and advantages thereof, will clearly appear from the following description and from the accompanying drawings, the different views of which are not necessarily scale drawings.

Figure 1:
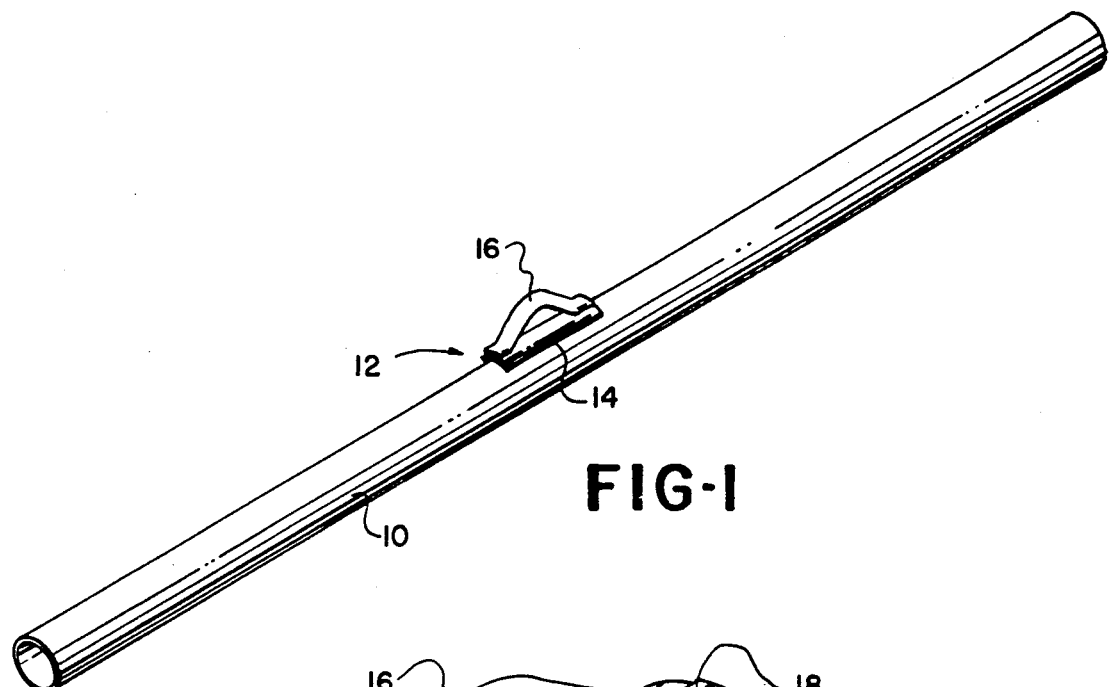
FIG. 1 is a perspective view of a joint of pipe with a handle attached to it according to this invention.
Figure 2:
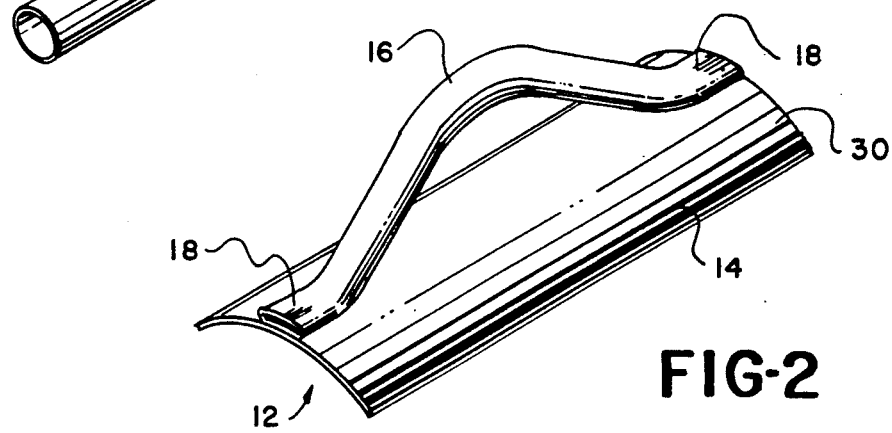
FIG. 2 is a perspective view of the saddle and handle to be attached to the pipe.
Figure 3:
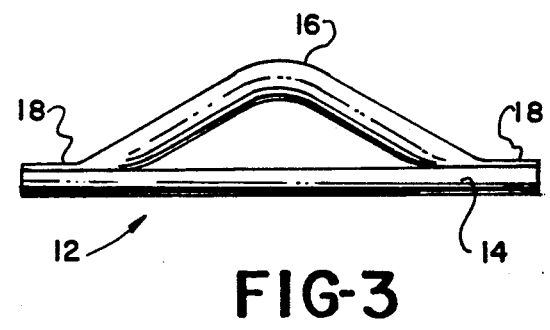
FIG. 3 is a side elevational view of the saddle and handle.
Figure 4:
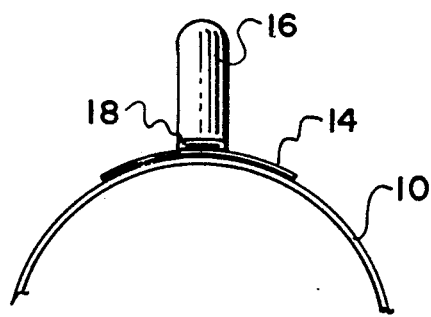
FIG. 4 is an end view of the saddle and handle on a pipe with the pipe broken away for conciseness.

As an aid to correlating the terms of the claims to the exemplary drawing, the following catalog of elements and steps is provided:

10 pipe
12 assembly
14 saddle
16 handle
18 connecting portions
20 short tube
22 rod handle
24 reinforcement tubes

DESCRIPTION OF THE PREFERRED EMBODIMENTS

Referring to the drawing, there may be seen a joint of irrigation pipe 10 with assembly 12 according to this invention attached thereto. For clarity and conciseness the end connections and the gates have not been shown.

As stated before, the joint agricultural irrigation pipe 10 would be a section of pipe about 20 feet long. The ordinary sizes of this PVC pipe as commonly used are 8" or 10".

Using the 8" pipe as a specific example, saddle 14 is fashioned from 8" pipe. The saddle would be about 12" in length and be a section or arc of a cylindrical pipe. The saddle 14 has the same curvature as the pipe 10. Of course, 8"'pipe will have about 25" circumference.

Therefore, if the pipe were cut axially into four pieces, each of the pieces would have a circumferential measurement of about 6¼". If it were sliced into 8 pieces, each sector would have a circumferential arc of about 3". The preferred mode is to cut each of them into about six pieces so that each segment covers about 4". However, this is not critical. In face it could be cut into 12 pieces so that the saddle was no more than 2" and satisfactory results may be obtained.

Handle 16 is made from schedule 40 PVC pipe having a nominal size of about ¾". Such pipe will have an outside diameter of about 1". The material that the handles are made from is heated in hot water until it is soft and moldable and it is bent somewhat into a rounded shape in the center portion and has about 3" of parallel portions on each end. The handle 16 will have a shape similar to the Greek letter Omega. The parallel portions are flattened as shown and curved slightly having a radius of about 8" or 9". After the handle 16 is formed it is adhered to the saddle 14 by well-known glues commercially on the market specifically adapted for gluing PVC pipe. The handle is glued to the saddle as shown in the drawings.

The assembly of the handle as glued to the saddle can be sold in this configuration. The farmer, who already has PVC pipe can glue the saddle to the PVC pipe. Otherwise the pipe with saddle and the handle may be sold as a single unit. Basically the narrower saddles 14 are easier to glue to the PVC pipe than saddles having greater circumferential extent. Also, since the handle 16 has less contact with the saddle 14 than the saddle does with the pipe 10, if there were to be a glue failure, it would be more likely to occur between the handle and the saddle than the saddle to the pipe. However, I prefer not to use the minimum width of about 2" because it is believed that the additional saddle will give more of a reinforced pad upon the pipe 10 to attach the handle 16 to the pipe, therefore not producing any strain in the pipe.

Figure 5:
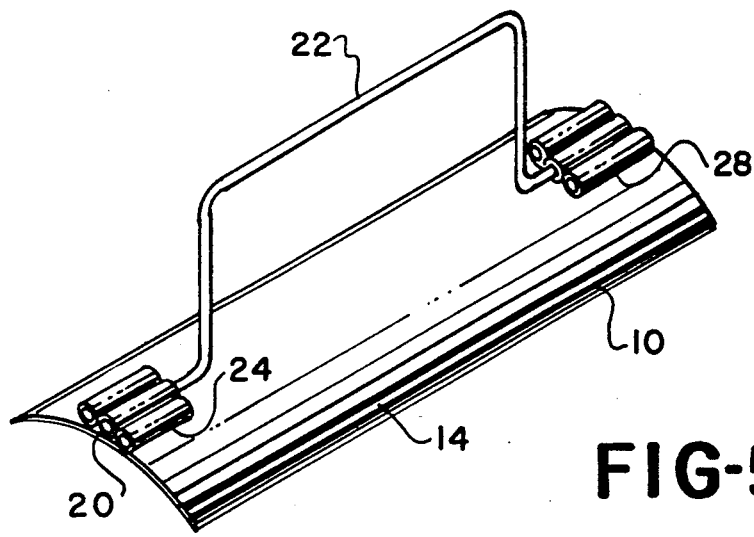
FIG. 5 is a perspective view of a second embodiment of a handle attached to a saddle.
Figure 6:
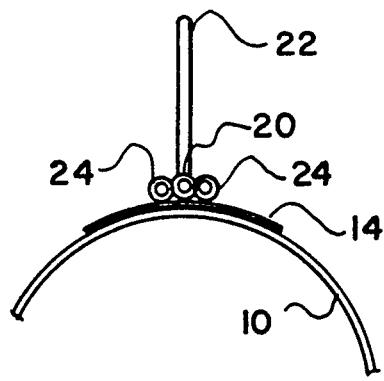
FIG. 6 is an end elevational view of the second embodiment attached to the pipe with the pipe broken away for clarity.

FIGS. 5 and 6 show another embodiment of this invention. In this embodiment, a very small diameter of PVC pipe or tube having a particularly thick wall thickness is glued to the pipe. Preferably short pieces of tube 20 having about 3" in length are glued to the saddle 14. The saddle is identical to saddle 14 as described above. During the gluing process, the short tube 20 has the end portion of rod handle 22 inserted therein. The short tubes 20 form connection portions of the handle 22 to the saddle 14.

The advantage of having the rod handle 22 inserted in the pieces of short tube 20 is that the rod can rotate within the inside of the short tube and lay flat against the pipe when not in use. This is advantageous when pipe is stacked for transportation or storage during the period it is not being used for irrigation. It will be understood that the short tube 20 also has the attachments of the handle made of PVC material which is glued to the PVC pipe by conventional glues for that purpose. Reinforcement tubes 24 are glued on either side of short tube 20 to better secure the short tube 20 to the saddle 14.

Therefore in the case of both the first embodiment and the second embodiment the attachment of the handle includes a saddle which has substantially the same cylindrical radius of the curvature as the pipe to which PVC handle element is glued to the saddle.

The embodiments shown and described above are only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A handle assembly for a joint of PVC pipe comprising:
   a. a saddle formed from a portion of PVC pipe having approximately the same diameter as the pipe to which the handle assembly is to be fixed,
   b. the handle having connecting portions fixed to a convex surface of the saddle,
   c. the connecting portions of the handle being formed from PVC and fixed to the saddle with an adhesive suitable for PVC to PVC bonds, and
   d. a hand gripping portion of the handle connected to the connecting portions of the handle so that the handle is fastened to the saddle.

2. The invention as defined in claim 1 wherein the saddle of the handle assembly is connected to a joint of PVC pipe.

3. The invention as defined in claim 1 wherein the connecting portions of the handle and the hand grasping portion of the handle are formed from
   e. a small PVC pipe having a size of about 1/10 of the size of the pipe from which the saddle is made.

4. The invention as defined in claim 1 further comprising:
   e. said connecting portion of the handle being two, spaced apart co-axial small diameter tubes adhered to the PVC saddle, and
   f. said hand gripping portion of the handle being a rod having one end telescoped into one of said small tubes and the other end of said rod telescoped into the other of said small tubes.

5. The process of connecting a handle to a joint of PVC pipe and comprising the following steps:
   a. constructing a saddle from a portion of PVC pipe having a curvature similar to the curvature of the pipe joint to which said handle is to be affixed,
   b. constructing a handle with connectors made of PVC material,
   c. creating a handle assembly by affixing the connectors to the saddle with an adhesive suitable for bonding PVC to PVC, and
   d. attaching the saddle of the handle assembly to the pipe joint with an adhesive suitable for bonding PVC to PVC.

6. The invention as defined in claim 5 comprising the additional steps:
   e. forming said handle from a section of PVC pipe having about 1/10 the diameter of the joint of PVC pipe by
   f. bending the handle into an omega shape,
   g. flattening the two end portions of said omega shape, and
   h. the two ends of the omega shape constituting said handle connectors.

7. The agricultural irrigation equipment comprising:
   a. a joint of PVC agricultural irrigation pipe, b. a saddle having a convex and concave surface glued approximately half way between the ends of the pipe,
c. the concave surface of the saddle glued to the convex surface of the pipe,
d. said saddle being cut from PVC pipe having the same diameter as said joint of agricultural irrigation pipe,
e. said saddle having a circumferential width of no greater than ¼ of the joint of irrigation pipe,
f. said saddle having a length of about 1/20 of the length of said irrigation pipe, and
g. an Omega shaped handle glued to the convex surface of said saddle,
h. said handle made of PVC pipe having a diameter of not greater than 1/6 of the agricultural irrigation pipe,
j. said ends of said PVC handle being flattened and curved to the same curvature of the convex side of said saddle.

8. The invention as defined in claim 7 wherein said width of the saddle is more than 1/12 the circumference of the joint of irrigation pipe, and the diameter of the handle is about 1/10 the diameter of the pipe.

* * * * *